(No Model.) 2 Sheets—Sheet 1.
W. F. COCHRANE & G. T. SMITH.
FLOUR BOLT.
No. 311,873. Patented Feb. 10, 1885.
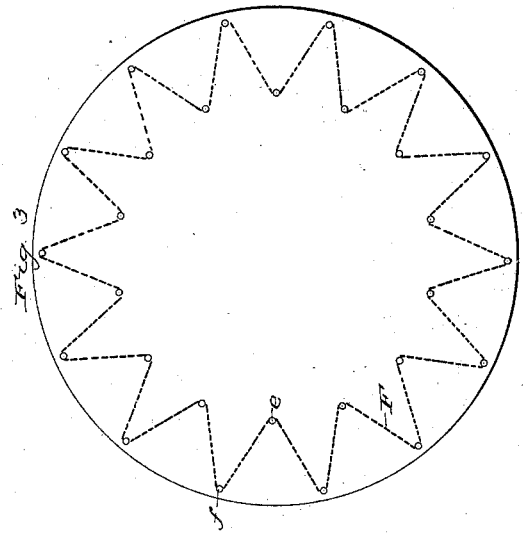
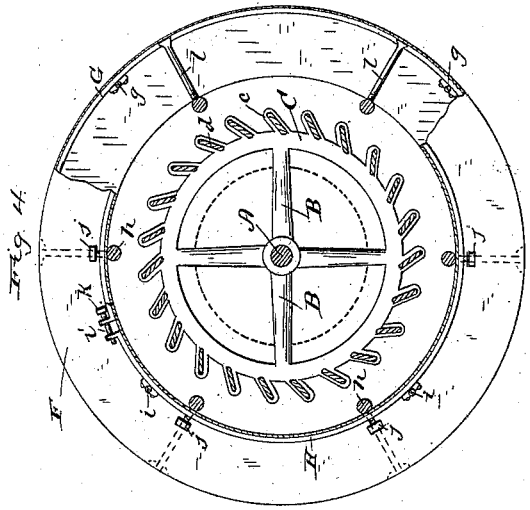
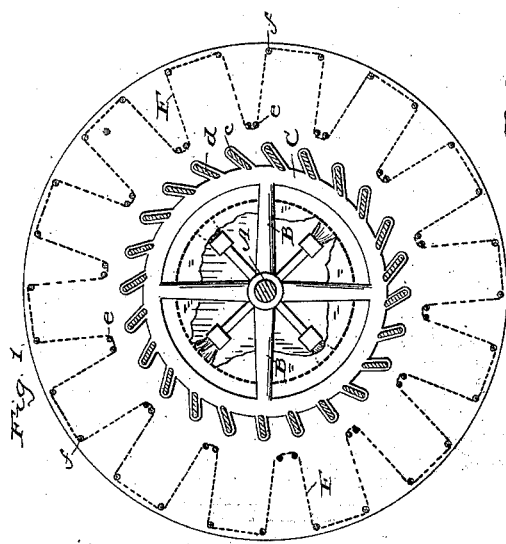
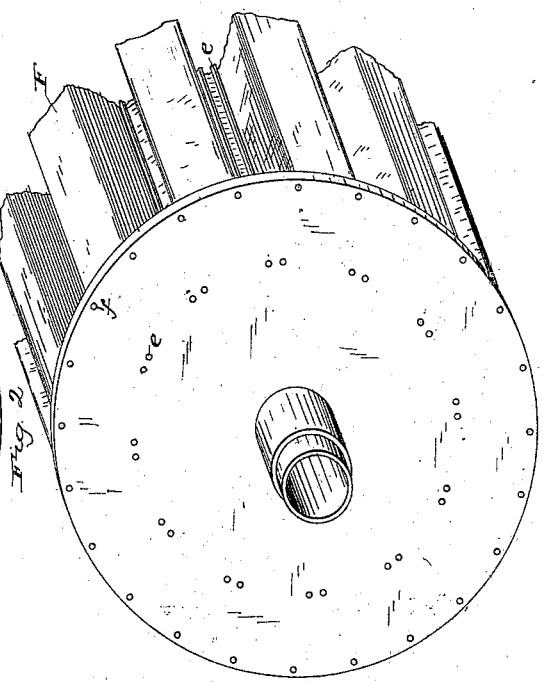
Witnesses,
H. N. Low
A. J. Houghton
Inventors,
William F. Cochrane
and George T. Smith
by Doubleday & Bliss, attys.
N. PETERS. Photo-Lithographer, Washington, D. C.

(No Model.) 2 Sheets—Sheet 2.
W. F. COCHRANE & G. T. SMITH.
FLOUR BOLT.
No. 311,873. Patented Feb. 10, 1885.
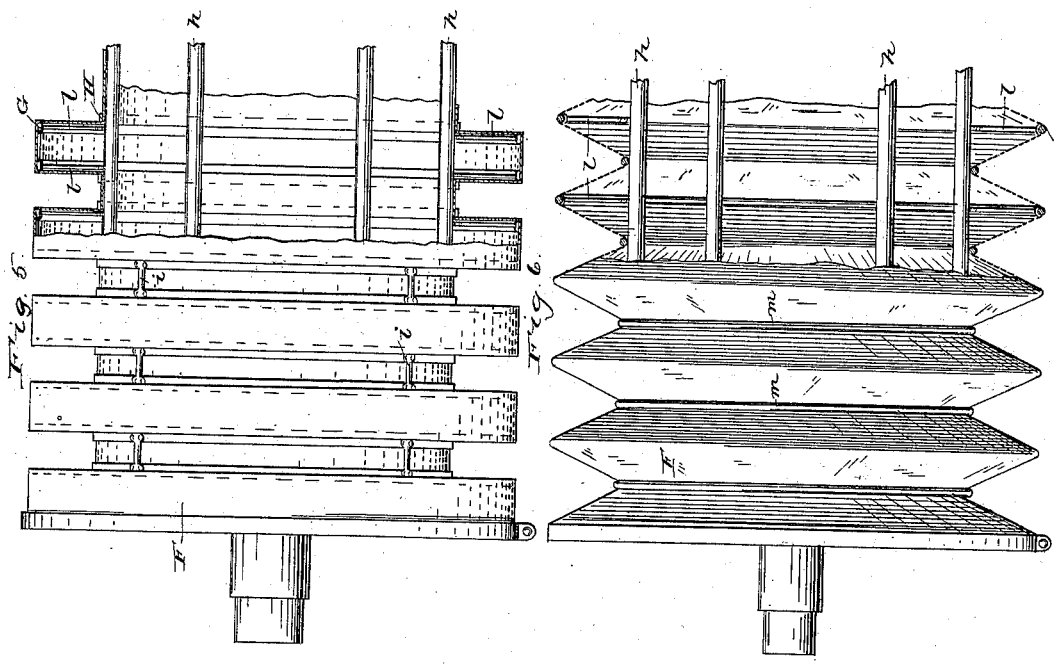
Witnesses
N. N. Low
A. J. Houghton
Inventor
William F. Cochrane
and George T. Smith
by Doubleday & Bliss attys.

UNITED STATES PATENT OFFICE.

WILLIAM F. COCHRANE, OF INDIANAPOLIS, INDIANA, AND GEORGE T. SMITH, OF JACKSON, MICHIGAN.

FLOUR-BOLT.

SPECIFICATION forming part of Letters Patent No. 311,873, dated February 10, 1885.

Application filed March 21, 1883. (No model.)

*To all whom it may concern:*

Be it known that we, WILLIAM F. COCHRANE and GEORGE T. SMITH, citizens of the United States, said COCHRANE residing at Indianapolis, in the county of Marion and State of Indiana, and said SMITH residing at Jackson, county of Jackson, State of Michigan, have invented certain new and useful Improvements in Flour-Bolts, of which the following is a specification, reference being had therein to the accompanying drawings.

Figure 1 is a vertical transverse section of a reel containing our invention. Fig. 2 is a perspective view, partly broken away, with the beaters and disintegrator removed. Fig. 3 is a vertical section of a portion of a reel, showing a modification. Fig. 4 is a vertical transverse section of a modification with the beaters removed. Fig. 5 is a side elevation of a part of the reel shown in Fig. 4, and Fig. 6 is a similar view showing a modification.

This invention is designed more specifically for use in connection with "centrifugal reels," as they are commonly termed, but need not be limited thereto.

Referring to Figs. 1 and 2, A is the central longitudinal beater-shaft. B B are the arms, and C the rim, of the spider. *c c* are the tangential sockets in which are supported the beater-blades *d d*. *e e* are a series of rods arranged upon a circle the center of which is the beater-shaft, and having their ends supported in the reel-heads E. *f f* are a corresponding series of rods, having their ends supported in the reel-heads and arranged upon a circle which is concentric with and of greater diameter than the circle of the rods *e e*. F is the bolting-cloth, arranged in zigzag lines and supported upon the inner and outer series of rods *e f*, so as to form a stellated reel, whereby a greater increased bolting-surface is produced with a reel of given diameter and length. In Figs. 1 and 2 the bolt-cloth is arranged to form chambers having two parallel sides with their open mouths toward the beaters. In Fig. 3 a fewer number of supporting-rods is used, all the sides of the chambers being made converging. The material to be treated is fed through one of the reel-heads E into the center of the reel, which communicates directly with the chambers formed by the corrugations in the bolting-surface, and is left unobstructed to allow the operation of the beaters when the bolt is used as a centrifugal reel. In all of these figures, however, the corrugations are circumferential, and the reel may be clothed with a single piece of cloth of rectangular form, and may be stretched by means of hoops at each end of the reel by the use of the tenter-hooks *s*, as shown in the Finch Patent No. 264,824, or by such other appliances as may be found convenient.

In Figs. 4 and 5 we have shown another construction of reel, which is corrugated lengthwise. In these figures. *h h* are a series of supporting-rods arranged in a circle of which a beater-shaft (not shown in the drawings) is the center. *l l* are a series of supporting-rods which project outwardly and radially from the bars *h h*. G G are outer cloth-rings supported upon the outer ends of rods *l l*, and *g g* are supporting cross-bars attached to each adjacent pair of the outer cloth-rings, G G, preferably upon their inner faces, by means of rivets or their equivalents. H H are the inner cloth-rings, each pair being connected with each other by means of supporting cross-bars *i*, and also attached to the longitudinal bars *h h* by means of set-screws *j*. The cloth J is supported upon the outer surfaces of the outer rings, G G, and upon the inner surface of the inner rings, H H, thus forming chambers each of which extends continuously around the reel, these chambers being arranged side by side.

When preferred, the set screws *j j* may be dispensed with, thus avoiding the necessity for perforating the cloth to receive them, and also permitting that the inner rings, H H, may be contracted by means of a right and left hand screw-bolt, *k*, which passes through outwardly-projecting lips or lugs *l' l'* at the ends of the rings for the purpose of tightening the cloth; or the cross-bars *i i* may be dispensed with. In each case the set-screws *j j* should be employed, and by making the rings H H in segments the cloth can be tightened by means of these set-screws. In this construction we prefer to make the cloth of such pattern as shall insure that it may be properly applied to the reel and stretched without wrinkles.

In Fig. 6 we have shown another modification, in which the walls of the chambers are made converging instead of parallel, in which case the inner and outer rings are arranged alternately, the inner ring, by preference, consisting simply of a cord or strap, m, which can be taken up at pleasure to produce the desired tension upon the bolting-cloth.

The devices shown in Patent No. 233,411 for securing the bolting-cloth upon the reel may also be advantageously used under some circumstances, especially for stretching the cloth lengthwise upon the bolt. Under other circumstances we may simply stretch the cloth by hand and tack it to the heads and other portions of the reel.

Although we have shown and described the best means now known to us for carrying out our invention, yet we do not wish to be limited thereby, as many other obvious modifications might be made without departing from its spirit.

Of course any desired form of disintegrator or beaters may be used in connection with our improved reel.

We are aware that revolving coal and ore screens, ash-sifters, and like devices having corrugated or stellated surfaces are known; but in such devices the screening-surfaces have been formed from perforated metal or stiff wire-grating or sieve, which were not and did not require to be supported upon two or more series of rods or rings corresponding to the cloth-supports of applicants, their natural stiffness enabling them to retain any desired shape by simply attaching them to the screen-heads or supporting them intermediately upon a single series of supports.

We are also aware that there is shown in English patent to Hill, No. 923, of 1860, a bolt having a stellated screening-surface supported upon two series of bars, of which one series was movable toward and from the other to change the mesh of the screen, and we do not claim such device.

We do not in this application claim specifically the features shown in Figs. 4, 5, and 6, as such constructions have been by us made the subject-matter of another application, filed May 17, 1883, Serial No. 95,291, wherein we propose to base claims upon such construction.

What we claim is—

1. In a flour-bolting reel, the combination of the reel-heads, one of which is provided with a central feed-opening, an inner series of cloth-supports mounted in the reel-heads, an outer series of cloth-supports mounted in the reel-heads, and a bolting-cloth supported by said cloth-supports, whereby there is formed a bolting-reel having a corrugated surface, substantially as set forth.

2. In a flour-bolting reel, the combination of the reel-heads, one of which is provided with a central feed-opening, a series of cloth-supporting devices mounted in the reel-heads concentrically with the axis, another series of cloth-supporting devices mounted in the reel-heads concentrically with the axis and outside of the other series of cloth-supports, and a bolting-cloth which passes outside of the outer series of cloth-supports and inside of the inner series, whereby there is formed a bolting-reel having a series of corrugations or chambers opening into the inside of the reel, substantially as set forth.

3. In a flour-bolting reel, the combination of the reel-heads, one of which is provided with a central feed-opening, two series of cloth-supporting devices mounted in the reel-heads, one series being situated outside of the other, and a bolting-cloth having portions of its surface in substantially parallel planes, and other portions attached to and joining the outer edges of said parallel portions, substantially as set forth.

4. In a flour-bolting reel, the combination of the reel-heads, one of which is provided with a central feed-opening, two series of cloth-supporting devices mounted in the reel-heads, one series being situated outside of the other, a bolting-cloth mounted upon said cloth-supports, having portions of its surface situated upon lines corresponding to the periphery of the reel, other portions situated upon lines corresponding to a circle of smaller diameter than the periphery of the reel, and other portions connecting the parts situated upon the two said concentric circles, substantially as set forth.

5. In a flour-bolting reel, the combination of the reel-heads, the beaters within the reel, cloth-supports arranged in two concentric series one within the other, and the bolting-cloth mounted on said cloth-supports, substantially as set forth, to form a reel having a corrugated surface.

In testimony whereof we affix our signatures in presence of two witnesses.

WILLIAM F. COCHRANE.
GEORGE T. SMITH.

Witnesses:
GEO. S. BENNETT,
A. L. FAULKS.